Figure 1:
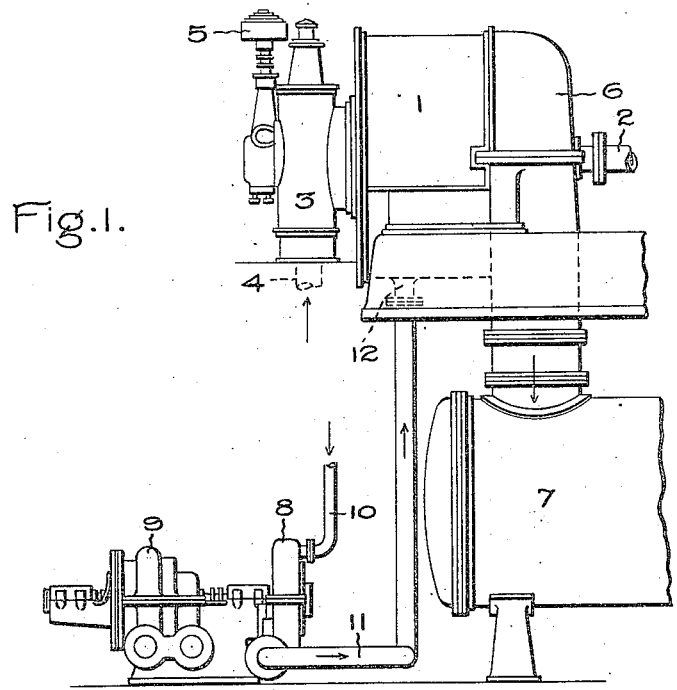

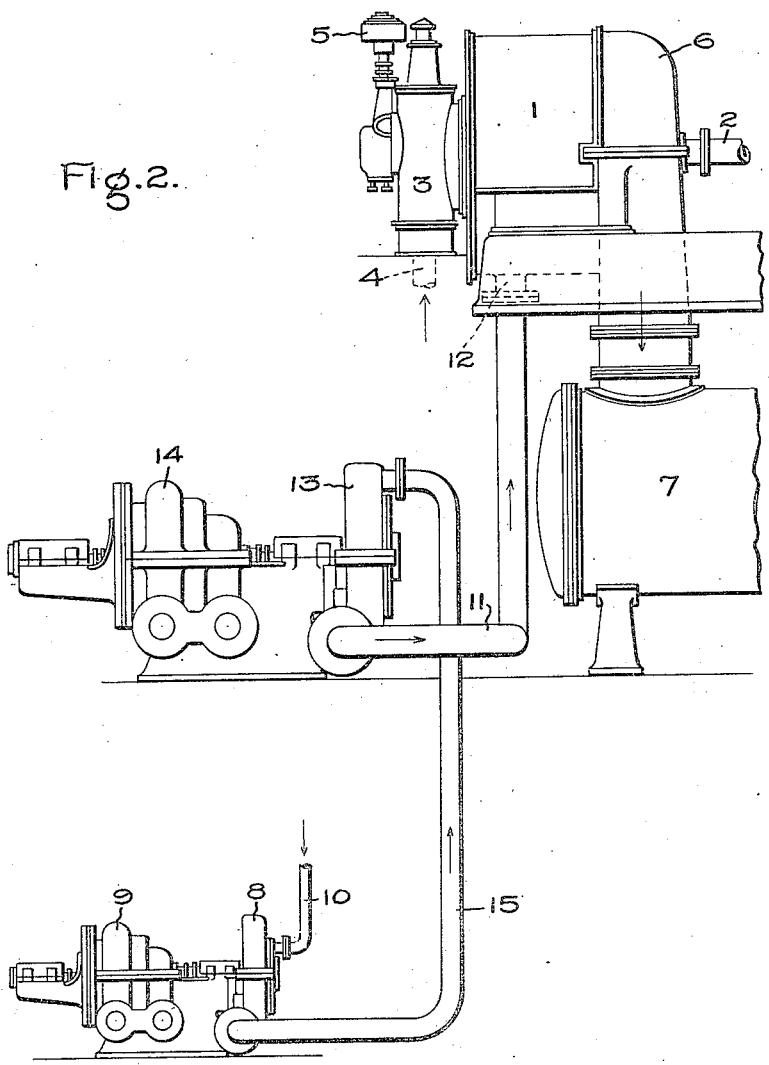

UNITED STATES PATENT OFFICE.

WALTER KIESER, OF BERLIN, GERMANY, ASSIGNOR TO GENERAL ELECTRIC COMPANY, A CORPORATION OF NEW YORK.

TURBINE SYSTEM.

1,081,388.

Specification of Letters Patent.

Patented Dec. 16, 1913.

Application filed March 7, 1908, Serial No. 419,652. Renewed October 31, 1912. Serial No. 728,913.

*To all whom it may concern:*

Be it known that I, WALTER KIESER, a citizen of Switzerland, residing at Berlin, Germany, have invented certain new and useful Improvements in Turbine Systems, of which the following is a specification.

In modern power plants for generating electricity or propelling ships it is customary to employ turbines as prime movers. It is desirable on account of their extreme simplicity, small size and rugged character to utilize turbines for driving the auxiliary apparatus commonly used in such plants, such for example as the pump for forcing circulating water through the condenser receiving the exhaust from the main turbines and the pump extracting air from the system. The pumps or other auxiliary apparatus to be driven and which require only a moderate amount of power are preferably and usually adapted for comparatively low shaft speeds. On the other hand, turbines designed for moderate outputs must in order to operate economically with the usual pressure differences employed for the main turbines run at high speeds. Further it is undesirable for obvious reasons to throttle the steam to greatly reduce its pressure, or to reduce the shaft speed by greatly increasing the number of the rows of buckets or stages or both which latter features would so greatly increase the size of the turbine as to offset its advantages as will readily be understood.

The present invention has for its object to overcome these difficulties and to provide a system or arrangement wherein the turbines driving the auxiliary apparatus may be operated at any desired low speed and the efficiency of the system as a whole maintained at a high point.

In carrying out my invention the main turbine or turbines are connected to the boiler and the condenser or other exhaust in the usual way. The rotating element may be connected to the rotating part of an electric generator, to the propeller of a ship or other load. In a turbine thus arranged the steam pressure, which may be 175 pounds or more, decreases from the boiler to the exhaust as the steam expands either by a series of steps or gradually, depending upon the type of turbine. Such being the fact it will be seen that I can take steam at boiler pressure, pass it through the auxiliary turbine wherein a predetermined and relatively small pressure drop is maintained and discharge it at some intermediate point or stage into the main turbine from which point to the exhaust it will perform useful work in the usual way. It thus follows that instead of working over the entire pressure range or drop of the motive fluid in the auxiliary turbine only a small portion of the range or drop is utilized and this without wasting energy. To state the matter in a different way the steam is permitted to expand to only a limited extent and the amount of work performed is governed by the amount of said expansion. Instead of passing steam at boiler pressure into the auxiliary turbine and exhausting therefrom into the main turbine at a point of intermediate pressure, I may take steam from some intermediate point or stage of the main turbine pass it through the auxiliary turbine and then cause the exhaust to reënter the main turbine and again do useful work.

The auxiliary turbine will be designed in the usual way to work between the predetermined and relatively small pressure difference whatever this may be, and this with maximum efficiency. By reason of the fact that the auxiliary turbines work on a small pressure difference the shafts thereof will be rotated at speeds best suited for the pumps or other apparatus driven thereby while high economy is preserved.

Where it is desired to use two or more auxiliary turbines they may be connected in series and either arranged to receive steam directly from the boiler or after it has performed work in the main turbine. The exhaust from the auxiliary turbines will enter the main turbine at some point having a pressure about the same as said exhaust and thereafter perform useful work. The regulation of these auxiliary turbines is an important feature of my invention since they should at all times receive sufficient steam to handle their load irrespective of the load on the main turbine which may vary within wide limits. Further the operation of these auxiliary turbines should in no way endanger the operation of the main turbine. The amount of energy used in the auxiliary turbine may be regulated by regulating the amount of steam supplied thereto, or its initial or its final pressure. For example where an auxiliary turbine ordinarily receives its steam from an intervening stage of the main turbine, an automatic arrangement may be provided whereby steam from the boiler is supplied when the steam from the main turbine is insufficient.

If the load on the auxiliary turbine is constant and the load on the main turbine decreases there is danger that the latter will race if continuously supplied with a given and practically constant amount of steam from the auxiliary turbine, since the governing mechanism of the said main turbine will not directly act thereon. To provide for such a condition an automatic device may be provided which partly or entirely cuts off the exhaust conduit leading from the auxiliary to the main turbine, and connects the auxiliary turbine to an exhaust.

Figure 4:
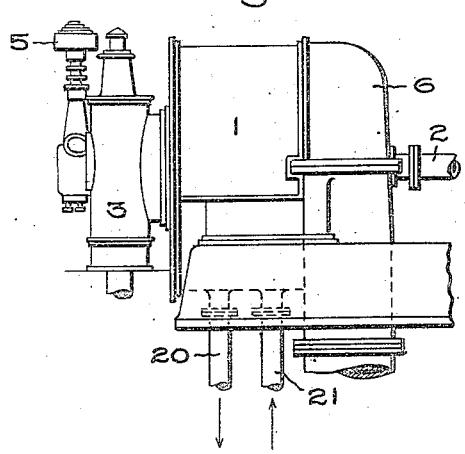
Figure 5:
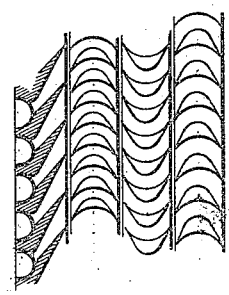
Figure 3:
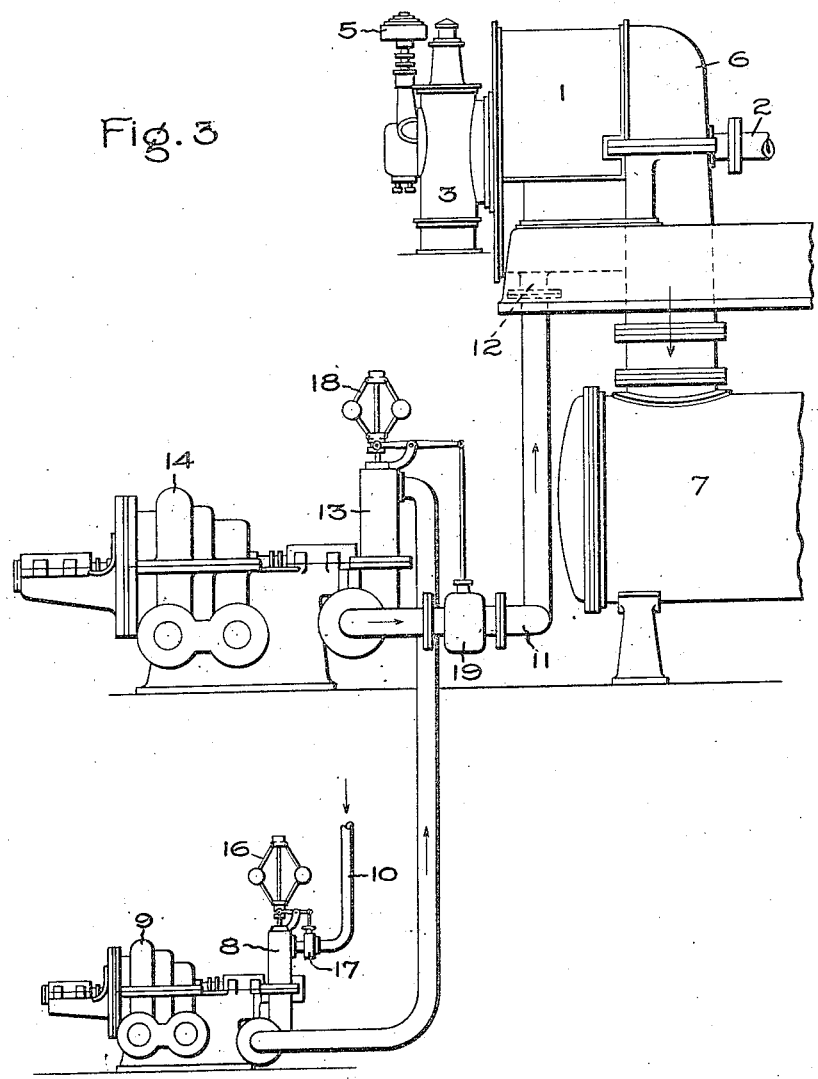

In the accompanying drawings which illustrate some of the embodiments of my invention, Figure 1 shows an arrangement wherein the auxiliary turbine receiving steam at boiler pressure discharges its exhaust into an intermediate stage or region of intermediate pressure in the main turbine; Fig. 2 shows an arrangement wherein two auxiliary turbines are provided which exhaust into an intermediate stage or region of pressure in the main turbine; Fig. 3 shows an arrangement similar to Fig. 2 wherein regulating devices are provided for both of the auxiliary turbines; Fig. 4 shows an arrangement wherein steam is taken from an intermediate stage or region of pressure in the main turbine for the auxiliary turbine or turbines which exhaust into a stage or region of still lower pressure in the main turbine; and Fig. 5 shows the nozzles and buckets of a turbine of the Curtis type which may be taken as illulstrative of the turbines shown.

Referring to Fig. 1, 1 indicates the main turbine which may be of any desired construction. In the present illustration of the invention it is shown as being a multi-stage turbine of the Curtis type. 2 indicates the main shaft of the turbine which may be connected to a rotating element of an electric generator or to a propeller or other load. Steam or other elastic fluid is admitted to the valve-chest 3 by the conduit 4, the latter being connected to a boiler, not shown. The passage of motive fluid through the turbine is controlled by the governor 5 which may be of any approved type. In the present instance it is responsive to speed variations of the shaft 2. The exhaust from the turbine enters the conduit 6 and passes to the condenser 7 or other exhaust. A surface condenser is illustrated but a jet or other condenser may be employed. 8 indicates an auxiliary turbine which is directly connected to a centrifugal pump 9 of ordinary construction for pumping circulating water through the condenser 7. The power for driving this pump is comparatively small. For example, the turbine may develop, say, 1000 H. P. at the shaft 2 and the auxiliary turbine about 10 H. P. at its shaft under normal conditions. The small amount of power required of the auxiliary turbine is due to the fact that the centrifugal pump is intended to raise water only a comparatively small height and hence the revolutions per unit of time of the impeller are small. Under these conditions the shaft of the auxiliary turbine being direct connected to the pump should operate at a comparatively low speed. Steam is supplied to the auxiliary turbine by the conduit 10 which is or may be connected to the same source that supplies the main turbine. For convenience conduits 4 and 10 are shown as being separate but obviously they may be connected. Steam after acting on the buckets of the auxiliary turbine which is preferably, but not necessarily, of the Curtis type, passes by the conduits 11 and 12, into an intermediate stage or region of pressure lower than the initial of the main turbine. From this point the steam acts on the buckets of the main turbine to perform useful work, together with the steam that enters from the conduit 4. The pressure of the steam in the stage communicating with the conduits 11 and 12 should correspond as closely as possible to the exhaust pressure of the auxiliary turbine.

In Fig. 2 the main turbine is arranged in the same manner as that described in connection with Fig. 1. In this case, however, two low speed auxiliary turbines 8 and 13 are provided, which are direct connected to centrifugal pumps 9 and 14 respectively. Two turbines are shown but a greater number can be employed if desired. Steam enters the auxiliary turbine 8 by the conduit 10 which is connected to the boiler or other source of supply and after acting on the buckets of this turbine and giving up energy passes by the conduit 15 to the second auxiliary turbine 13. Steam after acting on the buckets of this turbine and giving up energy passes by the conduit 11 to the conduit 12 which communicates with a stage or region of intermediate pressure between the supply and the exhaust of the main turbine. This steam mixing with that from the supply from the main 4 passes through the remaining rows of buckets and fluid discharging devices and after performing useful work passes by the exhaust conduit 6 into the condenser 7. The arrows indicate the direction of the steam flow.

In Fig. 3 is shown an arrangement similar to that of Fig. 2, except that regulating devices are provided for regulating the passage of steam through the auxiliary turbines. The auxiliary turbines are connected in series as before and receive steam directly from the boiler. Mounted on the turbine 8 is a speed governor 16 which controls the passage of steam from the boiler through the conduit 10; the said governor acting on a valve mechanism of suitable construction such, for example, as a throttle or other valve 17. The governor and valve 17 will admit more or less steam to the auxiliary turbines, depending upon the load. Mounted on the second auxiliary turbine 13 is a speed-responsive device 18 which is driven by the main shaft and controls a suitable valve mechanism such, for example, as the throttle or other valve 19 located between the exhaust of the auxiliary turbine and the conduit 11 conveying steam to a point of intermediate pressure in the main turbine. The regulating mechanism of the second auxiliary turbine throttles the exhaust conduit 11 to a greater or less extent according as the pressure prevailing in the stage or region of pressure connected with the conduit 12 increases or decreases with a change in load on the main turbine 1.

In Fig. 4 is shown a main turbine 1 of the construction previously described, and the auxiliary turbine or turbines instead of taking steam directly from the boiler receive it from the conduit 20 which is connected to an intermediate stage or region of intermediate pressure and after the steam therefrom acts on the rotating member of the auxiliary turbine or turbines, enters by the conduit 21 into a stage or region of pressure lower than that from which it issues. This steam then mingles with that from the main source of supply and performs useful work between this point or region of intermediate pressure and the point of final exhaust. In this case the auxiliary turbine should be designed to effectively use the steam between the pressure of admission and exhaust as before, and owing to the fact that this pressure may be comparatively small it follows that the auxiliary turbine may be run economically at a comparatively low shaft speed, which as before pointed out, is desirable in systems of this kind. If the amount of steam supplied to the one or more auxiliaries is insufficient to handle the load steam at boiler pressure may be admitted. By using steam in the auxiliaries at high pressure the volume is much less than would be the case if it were used at low pressure and consequently the nozzles or other fluid discharging devices, buckets, etc., can be made relatively small.

I have referred to steam as being the motive agent but it is to be understood that other forms of vapor energy can be utilized.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,

1. In combination, a main turbine, and secondary turbines connected in series which are subjected to a smaller pressure difference than the main turbine, the secondary turbines being operated by a portion of the same motive fluid which passes through and operates the main turbine and exhausting into it.

2. In combination, a main turbine wherein a given drop in pressure of the motive fluid takes place, and secondary turbines wherein a drop in pressure takes place that is less than in the main turbine, the secondary turbines being connected in series and arranged in shunt to a portion of the main turbine and exhausting into it and operating by a portion of the same motive fluid which passes through and operates said main turbine.

3. In combination, a high-speed turbine, low-speed turbines connected in series, means causing a portion of the same motive fluid which passes through and operates the high-speed turbine to pass through and operate the low-speed turbines, and means discharging the exhaust from the turbine of lowest pressure into the high-speed turbine at a region of intermediate pressure.

4. In combination, a high-speed multi-stage turbine, an exhaust conduit therefor, a low-speed turbine, an exhaust conduit therefor, means admitting high pressure motive fluid to the turbines, means conveying the exhaust from the low speed turbine into an intermediate stage in the multi-stage turbine so that said exhaust will perform useful work as it flows to the exhaust conduit of the multi-stage turbine, and a governing mechanism for controlling the passage of said exhaust into the high-speed turbine.

5. In combination, a high-speed turbine, low-speed turbines, conduit means for connecting the low-speed turbines in series relation, and means for causing a portion of the same motive fluid which passes through the high-speed turbine and performs useful work to pass through and operate the low-speed turbines.

6. In combination, a prime mover, a low-speed turbine, means causing a part of the same motive fluid which passes through the low-speed turbine to enter the prime mover at a point of intermediate pressure and perform work therein, and a governing means for the turbine which controls the entrance of fluid to the prime mover and the exhaust from the turbine.

7. In combination, a prime mover, low-speed turbines operating on pressure differences less than that of the prime mover, means connecting the turbines in series relation, a conduit discharging the exhaust from the turbines into the prime mover at a region of corresponding pressure, a governing means which regulates the admission of motive fluid to one of the turbines, and a second governing means for regulating the exhaust from one of the turbines.

8. In combination, a main turbine, secondary turbines connected in series relation, said turbines driving independent loads, means for supplying motive fluid to the turbines, a conduit conveying exhaust from one turbine to another, and a valve in said conduit controlling the passage of fluid therein.

9. In combination, a main turbine, secondary turbines connected in series relation, said turbines driving independently variable loads, means for supplying motive fluid to the turbines, a conduit conveying exhaust from one turbine to another, a valve in said conduit controlling the passage of fluid therein, and a means for actuating said valve.

10. In combination, turbines driving independently variable loads, means for supplying motive fluid to the turbines, a conduit conveying exhaust from one turbine to a region of intermediate pressure in another, a valve in said conduit for controlling the passage of fluid, and a speed governor driven by the turbine whose exhaust passes through said conduit for controlling the valve.

11. In combination, a main turbine, secondary turbines connected in series and exhausting into the main turbine, and a governing mechanism controlling the passage of said exhaust.

12. In combination, a main turbine, secondary turbines connected in series and exhausting into the main turbine, a valve controlling the entrance of said exhaust into the main turbine, and a speed governor driven by one of the secondary turbines for controlling the passage of said exhaust.

13. In combination, a main turbine, secondary turbines exhausting into the main turbine, a speed governor and valve for the main turbine, a second speed governor and valve for one of the secondary turbines, a valve for regulating the passage of exhaust steam from one of the secondary turbines into the main turbine, and a speed governor for controlling said valve.

14. In combination, a main turbine, secondary turbines connected in series relation and operating on pressure differences which are smaller than that of the main turbine, and means causing motive fluid which passes through one turbine or set of turbines to perform useful work in the other.

15. In combination, a main turbine, secondary turbines connected in series relation and exhausting into the main turbine, said secondary turbines operating on pressure differences which are smaller than that of the main turbine, and a device responsive to the speed of one of the turbines for controlling the flow of motive fluid through the secondary turbines.

In witness whereof, I have hereunto set my hand this 18th day of February, 1908.

WALTER KIESER.

Witnesses:
 FRIEDRICH GANZERS,
 LUDWIG CRIBDIE.